United States Patent [19]

Johnston

[11] Patent Number: 4,756,326
[45] Date of Patent: Jul. 12, 1988

[54] POLYMERIC DRAG REDUCER PERFORMANCE BY INJECTION THROUGH A LAND-LENGTH DIE

[75] Inventor: Ray L. Johnston, Ponca City, Okla.

[73] Assignee: Conoco Inc., Ponca City, Okla.

[21] Appl. No.: 73,663

[22] Filed: Jul. 13, 1987

[51] Int. Cl.⁴ .............................................. F17D 1/16
[52] U.S. Cl. ...................................... 137/13; 137/896
[58] Field of Search ................................. 137/13, 896

[56] References Cited

U.S. PATENT DOCUMENTS 3,601,079  8/1971  Giles .................................. 137/13 X
3,826,279  7/1974  Verschuur ......................... 137/13 X Primary Examiner—Alan Cohan
Attorney, Agent, or Firm—C. R. Schupbach

[57] ABSTRACT

Drag reduction in fluids flowing through conduits is improved by the injection of high molecular weight fluid soluble drag-reducing polymers through land-length dies having multiple openings.

5 Claims, 1 Drawing Sheet

POLYMERIC DRAG REDUCER PERFORMANCE BY INJECTION THROUGH A LAND-LENGTH DIE

This invention relates to a method for improving drag reduction in fluids flowing through conduits. More specifically, this invention relates to an improved method for improving drag reduction in fluids flowing through conduits by injecting the drag reducing agent through at least one land-length die having multiple openings, each approximately at equal distance from the conduit wall. The method provides surprisingly increased drag reduction over current injection techniques by use of the land-length die.

This invention is an improvement over the invention described in an application entitled "Improved Dissolution Performance by Injection through a Die-Type Nozzle", filed concurrently with the present application, which uses a multiple opening die comprising a mesh or simple die plate.

Drag reduction of hydrocarbon fluids flowing through conduits is known as described in U.S. Pat. No. 3,629,676. This reference provides a method by which percent drag reduction can be measured. However, the reference describes similarly inserting the drag reducing additives as a dissolved solid.

Other representative, but non-exhaustive art in the area includes U.S. Pat. No. 3,736,288 in which various drag reducing formulations are added to exhibit a staggered dissolving or controlled dissolving characteristic using varying molecular weight fractions and/or particle size. The reference also discloses pumpability, pourability, stratification resistance and the like. U.S. Pat. No. 3,601,079 describes a water-soluble polymeric material mixed with water in a mixing chamber prior to injection into a pipeline. U.S. Pat. No. 3,884,252 describes a process for reducing oxidative degradation and cold flow of polymer crumb by immersing the crumb in a non-solvent and then dusting prior to injecting the polymer crumb or slurry of polymer crumb and water into a hydrocarbon fluid and allowing the crumb to gradually and continuously dissolve throughout the pipeline. Injection of friction reducing polymers is also described in U.S. Pat. No. 4,263,926. A drag reducing dispersing metering system is described in U.S. Pat. No. 3,900,034.

There also exists a group of art relating to a method for dissolving polymers in solvent. This art is non-exhaustively represented by U.S. Pat. Nos. 2,639,275, 3,468,322, 3,891,593 and 4,537,513. These references deal with methods for dissolving a fixed amount of polymer in a fixed amount of solvent utilizing recycling or dissolving means. However, such methods of dissolving polymer require extra apparatus and it would be highly preferable to inject drag reducing agents directly into a pipeline.

It is therefore an object of the present invention to provide a improved method for the injection of drag reducing agents into conduits containing flowing liquids in order to increase the drag reducing effectiveness of such additives. The present invention is useful for both aqueous and hydrocarbon pipelines and can be used for injection of either water soluble or hydrocarbon-soluble drag reducing additives. Such additives are normally polymers soluble in the flowing liquid. Other objects will become apparent to those skilled in this art as the description proceeds.

I have now discovered an improved method for the injection of high molecular weight polymers into conduits containing flowing liquid capable of dissolving said polymers comprising injecting said polymer as a solution containing up to 50% polymer through at least one land-length die having multiple openings wherein said openings are preferably each substantially at equal distances from the conduit wall. The invention further comprises a preferred embodiment wherein the openings are located substantially at the injection end of the die, the end of the die adjacent the flowing liquid, the die being a land-length die which provides even greater drag reducing effectiveness than multiple openings alone.

BRIEF DESCRIPTION OF THE DRAWINGS

The drawing is a FIGURE containing various die configurations and placements which refer to the experimental section of the application.

DETAILED DESCRIPTION OF THE DRAWINGS

Figure 1:
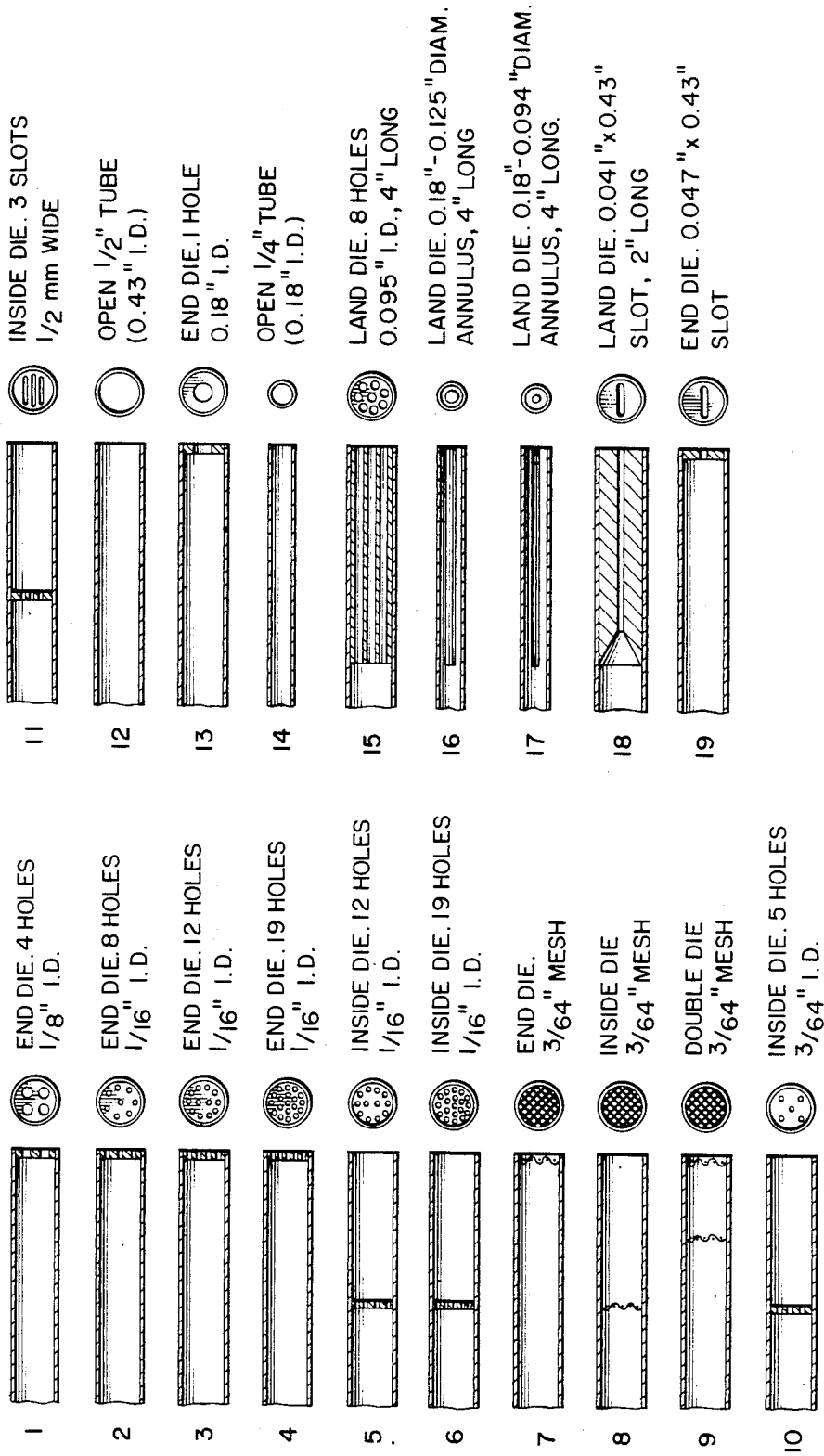

In FIG. 1, die configuration 1-1 shows a four-hole opening die, each opening $\frac{1}{8}$-inch in diameter. FIG. 1-2 shows an 8-hole opening die, each opening 1/16-inch in diameter. FIG. 1-3 shows a 12-hole opening die, each opening 1/16-inch in diameter. FIG. 1-4 shows a 19-hole opening die, each opening 1/16-inch in diameter. FIG. 1-5 shows a 12-hole opening die, each opening 1/16-inch in diameter, where the die is placed within the injection nozzle (inside die), allowing the polymer to recombine prior to injection. FIG. 1-6 shows a 19-hole opening die, each opening 1/16-inch in diameter, wherein the die is an inside die placed approximately 2 inches inside the nozzle. FIGS. 1-7 and 1-8 are comparative die configurations composed of 3/64-inch mesh, wherein 1-7 is at the injection end of the nozzle, and 1-8 contained the die approximately 2 inches inside the injection nozzle. FIG. 1-9 shows the same die placed in the line twice, once approximately $1\frac{1}{2}$ inches inside the injection nozzle and once at the nozzle end. FIG. 1-10 shows a 5-opening die, each opening 3/64 inch in diameter, placed approximately 3 inches inside the injection nozzle. FIG. 1-11 shows a three-slot die, each $\frac{1}{2}$ millimeter wide, placed about 3 inches inside the injection nozzle. FIG. 1-12 illustrates a conventional injection nozzle having a single open port at the injection end. FIG. 1-13 is a restricted die having 1 opening 0.18 inches in diameter. FIG. 1-14 is a $\frac{1}{4}$-inch tubing open die having a 0.18-inch opening. FIG. 1-15 shows a preferred embodiment comprising an 8-hole, 4-inch long land-length 4-inch long die having a length to diameter ratio of approximately 42.

FIG. 1-16 shows a die of annular or ring nature with an annulus 0.0275 inches wide and a length to diameter ratio of approximately 72. FIG. 1-17 shows a die of annular nature with an annulus 0.043 inches wide and length to diameter ratio of approximately 47. FIG. 1-18 shows a die with an 0.041×0.43 inch slot and a length to diameter ratio of approximately 24. FIG. 1-19 shows a die similar to 1-13 with a slot opening. Nozzles 1-16, 1-17, 1-18, and 1-19 were tested to observe the effectiveness of die shapes other than circular. Relative to an open end nozzle, these nozzles did show improvement. Nozzles 1-16 and 1-18 were especially effective. One observation during injection from these nozzles was that, although the die shapes are not open circles, within approximately 3 feet downstream of the injection point, the formed strands were solid cylindrical shapes. In each case, the strands underwent deformation immediately past the nozzle, losing the formed shape and acquiring a cylindrical shape. This deformation results in the most stable form for the strands, cylindrical, under the dynamics of the flowing liquid.

Drag reducing agents are currently injected in the pipelines containing either aqueous or hydrocarbon liquids to effect drag reduction. Obtaining optimum drag reduction effect depends on placing such agents such that efficient dissolution in the pipeline fluid is obtained. Such agents can be inserted into the pipeline in many forms, but current practice is to inject a very thick polymer solution containing up to about 50% polymer, but preferably containing 10% polymer by weight or less. The most preferred use for the present invention is for the injection of high molecular weight (over one million) non-crystalline hydrocarbon soluble drag reduction polymers into pipelines containing flowing hydrocarbons.

I have discovered that obtaining optimum dissolution depends heavily upon die configuration and injection. In current practice, one or more single opening dies are used to inject a polymer or polymer solution into the flowing hydrocarbon conduit. Using the present invention, a surprising increase in drag reduction efficiency is obtained. The effect is even greater than that found when using dies having multiple openings.

The present invention does not depend solely upon surface area effects, although in general larger surface areas are known to give better chances for dissolution. Using the present invention, however, other factors come into play and determine the overall effectiveness of the drag reducing additive.

Although theoretical in nature and I do not wish to be bound thereby, I believe that obtaining optimum dissolution is dependent upon forming stable polymeric strands of the drag reducing additives which enter the pipeline flow stream. These additives then "wire draw" to smaller diameter strands which can reach lengths of several hundred feet while dissolving under the dynamic effects of the flowing pipeline liquid. Using the current commercial practice of injecting the drag reducing additive through an individual open port in the pipeline wall, only limited dissolution and stranding is obtained. By using a nozzle or port with multiple openings, dissolution is improved. Likewise, stranding is improved by shear conditioning of the polymer solution to provide multiple strands which are stable under the wire draw and dynamic effects of the dissolution process. Such dies also provide optimum strand dimensions for dissolution, and the land length of the present invention provides even more strand stability.

The present invention is more concretely described with reference to the examples and figures below. The examples and figures are provided to illustrate the present invention and not to limit it.

The examples were carried out according to a test procedure which was standard throughout the examples. In the test procedure, dissolution capacity of various nozzles was tested by injecting a drag reducing additive, CDR ® Flow Improver, trademark of and sold by Conoco Specialty Products Inc. into Number 2 diesel fuel flowing through a 2-inch diameter pipe and measuring the resulting drag reduction as described in U.S. Pat. No. 3,692,676. The drag reducing test loop consists of 600 feet of 2-inch schedule 80 pipe containing 5 segments of 87 feet each. The pressure differential in each segment can be measured sequentially. The diesel fuel, at approximately 75 degrees F., was passed through the system at 60 gallons per minute (gpm), or 6.52 feet per second during testing. Various levels of CDR ® Flow Improver additive 102M (obtained from Conoco Specialty Products Inc.) was injected into the system at the same rate of 100 parts per million (ppm) in each test and the resultant drag reduction was measured in each pipe segment. Fifteen different nozzles were tested, most fabricated of ½-inch tubing. The injection pump used was a constant drive cylinder pump connected to the injection nozzle by a length of ½-inch tubing.

EXAMPLE 1

Eleven nozzle designs were tested to illustrate the effect of surface area on dissolution behavior. Test results showed that surface area does not completely control dissolution behavior. While a larger surface area allows a better chance of dissolution, other factors come into play which determine overall effectiveness. As set forth in the tables below, open tube nozzles having a higher surface area generation did not yield higher percent drag reduction, but actually yielded lower percent drag reduction in the first segment. Surface area generation rate was based on an injection rate of 23.4 cubic centimeters per minute. The results are set forth in Table 1.

TABLE 1

| Nozzle Tested | Wetted Perimeter (in.) | Open Flow Area (in$^2$) | Surface Area Generation Rate (in$^2$/SEC) | % Drag Reduction | |
|---|---|---|---|---|---|
| | | | | 1st Segment | 5th Segment |
| 12 | 1.35 | 0.145 | 0.22 | 18.2 | 43.0 |
| 14 | 0.57 | 0.0254 | 0.53 | 10.3 | 42.9 |
| 13 | 0.57 | 0.0254 | 0.53 | 14.5 | 44.4 |
| 1 | 1.57 | 0.049 | 0.76 | 35.8 | 54.3 |
| 2 | 1.57 | 0.0245 | 1.53 | 39.5/ 39.9 | 55.4/ 56.2 |
| 3 | 2.36 | 0.0368 | 1.53 | 40.9 | 55.2 |
| 4 | 3.73 | 0.0583 | 1.53 | 39.7 | 54.2 |
| 15 | 2.39 | 0.0567 | 1.00 | 44.1 | 60.3 |
| 7 | 5.25 | 0.062 | 2.02 | 40.7/ 40.3 | 55.8/ 54.4 |
| 9 | 5.25 | 0.062 | 2.02 | 34.5/ 32.1 | 49.7/ 49.9 |
| 16 | 0.96 | 0.0132 | 1.73 | 30.3 | 55.2 |
| 17 | 0.86 | 0.0185 | 1.11 | 17.3 | 47.6 |
| 18 | 0.94 | 0.0174 | 1.29 | 36.5 | 54.1 |
| 19 | 0.95 | 0.0202 | 1.12 | 32.3 | 51.4 |

The data of Table 1 clearly shows that for open tube nozzles a higher surface area generation rate did not always yield a higher drag reduction percentage, as can be seen by comparing nozzles 1-12 with 1-14. For the nozzles containing dies, best performance was obtained from nozzles providing medium surface area generation, as can be seen by comparing test results obtained from nozzles 1-13, 1-1, 1-2, 1-3, 1-4, and 1-7. For injection nozzles having the same surface area generation, a significant difference in percent drag reduction occurred due to other effects as can be seen by comparing nozzle 1-7 with 1-9.

EXAMPLE 2

Tests were carried out to show the relative importance of die placement. The effect of die placement on percent drag reduction is set forth in Table 2.

TABLE 2

| Nozzle Tested | Wetted Perimeter (in.) | Open Flow Area (in²) | Surface Area Generation Rate (in²/SEC) | % Drag Reduction 1st Segment | % Drag Reduction 5th Segment |
|---|---|---|---|---|---|
| 12 | 1.35 | 0.145 | 0.22 | 18.2 | 43.0 |
| 5 | 1.35 | 0.145 | 0.22 | 25.7 | 44.3 |
| 6 | 1.35 | 0.145 | 0.22 | 13.6 | 45.2 |
| 8 | 1.35 | 0.145 | 0.22 | 13.2 | 44.0 |
| 10 | 1.35 | 0.145 | 0.22 | 23.5 | 43.0 |
| 11 | 1.35 | 0.145 | 0.22 | 19.2 | 43.2 |
| 1 | 1.57 | 0.049 | 0.76 | 35.8 | 54.3 |
| 2 | 1.57 | 0.0245 | 1.53 | 39.5/ 39.9 | 55.4/ 56.2 |
| 3 | 2.36 | 0.0368 | 1.53 | 40.9 | 55.2 |
| 4 | 3.73 | 0.0583 | 1.53 | 39.7 | 54.2 |
| 7 | 5.25 | 0.062 | 2.02 | 40.7/ 40.3 | 55.8/ 54.4 |
| 15 | 2.39 | 0.0567 | 1.00 | 44.1 | 60.3 |

The test results as set forth in Table 2 show that dies placed several inches before the injection end of the nozzle did not yield a significant advantage in drag reduction performance over a fully open nozzle. The data also shows that a multiple hole die at the injection end of the nozzle yielded a significant advantage as set forth in examples 1-1, 1-2, 1-3, 1-4 and 1-7. It is clear that it is important to exert the die effects on the drag reducing additive immediately prior to entering the flow stream. Exerting die effects some distance prior to the injection end of the nozzle allows the drag reducing additive to recombine and relax from the effects of the die, thus lowering drag reduction efficiency.

In the present invention, a land-length die is utilized wherein each die opening is essentially extended for a distance sufficient to make the injection point more effective by more completely conditioning the drag reducing additive. This distance for die extension, or length of land, can be determined by the formula $$\frac{\text{length } (L)}{\text{hydraulic diameter } (D)}$$

wherein length is the length of the extended die and hydraulic diameter is the equivalent diameter of the opening as compared to a circular opening. Hydraulic diameter can be defined by the formula $$\frac{4 \times \text{cross-sectional area}}{\text{wetted perimeter}}$$

In order to obtain the benefits of the present invention, the L/D should be at least 1. It is preferred that the L/D be at least 10 and an L/D of from 20 to 100 is most preferred.

Dissolution performance can likewise be enhanced by using a land-length die wherein each opening is at a different distance from the conduit wall, but the lands are of equal length. In such a configuration, each die opening provides equal additive conditioning. The land-length die affects the rheology of the visco-elastic drag reducing polymers by changing the polymer work history immediately before injection into the liquid. The land-length appears to greatly lower die swell, promote strand stability and increase dissolution rate and resultant drag reduction.

The present invention thus modifies drag reducing additives mechanically prior to injection to enhance the physical flow properties and subsequently obtain better dissolution and stranding of the drag reducing additive. Better stranding properties as the drag reducing additive enters the pipeline flow stream provides stable strand formation which is essential to optimum dissolution and performance of the drag reducing additive.

It is only necessary that the die perform some work upon the drag reducing additive as injected. It is preferred that the die have multiple openings and contain at least four openings. The openings can be of the size desired and can include mesh and the like.

The effect of the present invention has not been seen in the prior art, since most meshes or screens in injections are used upstream of the injection nozzle and the injection pump the die and are used primarily for straining foreign objects from passage through the pump or injection into the pipeline. Thus, no improvement in drag reduction has been seen until a screen mesh or multiple die is placed at or near the end of the injection nozzle.

The openings can be around the circumference of an injection conduit so long as the openings themselves form the actual injection point. Dies known in the art, such as a "quill" or a "flute" where injection ports are at progressively different distances from the conduit wall do not provide the advantages of the present invention. Due to the non-Newtonian flow behavior of the drag reducing additive, the hydrocarbon does not flow evenly through the ports in a flute, causing a strongly fluctuating flow and resulting in severe strand-breaking effects, thus lowering drag reduction effectiveness.

While certain embodiments and details have been shown for the purpose of illustrating this invention, it will be apparent to those skilled in this art that various changes and modifications may be made herein without departing from the spirit or scope of the invention.

I claim:

1. An improved method for the injection of high molecular weight polymers into conduits containing flowing liquid comprising injecting said polymers as a solution containing up to 50% polymer through at least one die having multiple openings substantially at the injection end of the die, wherein the die is a land-length die, said land-length for each die opening being determined by the ratio L/D, where L is the length of the land and D is the diameter of the die opening, and wherein L/D is at least 1.0.

2. A method is described in claim 1 comprising injecting said polymers as a solution containing up to 50% polymer through at least one die wherein the die is a land-length die, said land-length determined by the ratio L/D, where L is the length of the land and D is each hydraulic diameter of the die opening, and wherein L/D is at least 10.

3. A method is described in claim 2 wherein the L/D is from about 20 to about 50.

4. A method as described in claim 1, 2 or 3 wherein the injected polymer is a high molecular weight, non-crystalline hydrocarbon soluble polymer and the flowing liquid is a hydrocarbon liquid.

5. A method as described in claim 4 wherein the die openings at the injection end of the die are at varying distances from the conduit wall, and wherein each opening has substantially the same L/D ratio.

* * * * *